United States Patent
Callens et al.

(10) Patent No.: US 12,487,114 B2
(45) Date of Patent: Dec. 2, 2025

(54) ELECTRONIC MEASURING DEVICE WITH ELECTRODE

(71) Applicant: Withings, Issy les Moulineaux (FR)

(72) Inventors: Victorine Callens, Issy les Moulineaux (FR); Matthieu Menanteau, Issy les Moulineaux (FR); Pierre-Arnaud Donnet, Issy les Moulineaux (FR); Hok Wai Yuen, Issy les Moulineaux (FR)

(73) Assignee: WITHINGS, Issy-les-Moulineaux (FR)

( * ) Notice: Subject to any disclaimer, the term of this patent is extended or adjusted under 35 U.S.C. 154(b) by 230 days.

(21) Appl. No.: 18/546,388

(22) PCT Filed: Jun. 15, 2022

(86) PCT No.: PCT/FR2022/051147
§ 371 (c)(1),
(2) Date: Aug. 14, 2023

(87) PCT Pub. No.: WO2022/269166
PCT Pub. Date: Dec. 29, 2022

(65) Prior Publication Data
US 2024/0302202 A1    Sep. 12, 2024

(30) Foreign Application Priority Data

Jun. 22, 2021 (FR) .................................. 2106653

(51) Int. Cl.
*G01G 19/44* (2006.01)
*C23C 14/35* (2006.01)
*C23C 14/58* (2006.01)
*G01G 3/14* (2006.01)

(52) U.S. Cl.
CPC ............. *G01G 19/44* (2013.01); *C23C 14/35* (2013.01); *C23C 14/5873* (2013.01); *G01G 3/14* (2013.01)

(58) Field of Classification Search
CPC ...... G01G 19/44; C23C 14/35; C23C 14/5873
USPC ........................................... 177/211
See application file for complete search history.

(56) References Cited

U.S. PATENT DOCUMENTS

| | | | |
|---|---|---|---|
| 6,775,566 B2 * | 8/2004 | Nissila | A61B 5/257 600/382 |
| 8,449,536 B2 * | 5/2013 | Selig | A61B 18/16 606/41 |
| 9,943,241 B2 | 4/2018 | Giovangrandi et al. | |
| 10,107,772 B2 * | 10/2018 | Carmignani | G01N 33/48721 |
| 10,610,157 B2 * | 4/2020 | Pandya | A61B 5/339 |

(Continued)

FOREIGN PATENT DOCUMENTS

| | | |
|---|---|---|
| FR | 2 875 599 A1 | 3/2006 |
| WO | WO 2017/079794 A1 | 5/2017 |

OTHER PUBLICATIONS

International Search Report as issued in International Patent Application No. PCT/FR2022/051147, dated Sep. 28, 2022.

*Primary Examiner* — Jacques M Saint Surin
(74) *Attorney, Agent, or Firm* — Pillsbury Winthrop Shaw Pittman LLP

(57) ABSTRACT

An electronic measuring device includes a weighing plate, extending along a measuring plane and including an upper face configured to receive a user's feet; a lower face, opposite the upper face, and a rounded edge connecting the upper face to the lower face; and at least one electrode extending on the weighing plate from the upper face over the rounded edge to the lower face.

17 Claims, 6 Drawing Sheets

(56) References Cited

U.S. PATENT DOCUMENTS 10,768,041 B2 * 9/2020 Xu ..................... G01G 23/3742
2003/0149374 A1 8/2003 Chai

* cited by examiner

ELECTRONIC MEASURING DEVICE WITH ELECTRODE

CROSS-REFERENCE TO RELATED APPLICATIONS

This application is the U.S. National Stage of PCT/FR2022/051147, filed Jun. 15, 2022, which in turn claims priority to French patent application number 2106653 filed Jun. 22, 2021. The content of these applications are incorporated herein by reference in their entireties.

TECHNICAL AREA

The present disclosure relates to the field of electronic measuring devices and in particular to electronic body scales. More specifically, the present disclosure relates to an electronic measuring device for measuring weight (or mass), body impedance, electrocardiogram (ECG), impedance plethysmography (IPG), ballistocardiogram (BCG) and/or detecting neuropathies. The present disclosure also relates to a method of manufacturing such an electronic measuring device.

Previous Technique

An electronic body scale commonly comprises a weighing plate, on which a user is placed, and a base, defining an internal volume housing electronic circuits for determining the user's biometric measurements. The weighing plate may be equipped with electrodes designed to come into contact with the user. The electrodes may be used, for example, to perform impedance measurements (bioimpedance analysis, BIA, or impedance plethysmography analysis, IPG), electrocardiograms (ECG) and/or to detect neuropathies.

In the case where the body scale comprises such electrodes, there is a need to electronically connect the electrodes to the electronic circuits received inside the body scale.

Some body scales provide holes in the weighing plate and solder electrical wires to join the electrodes, as briefly described in U.S. Pat. No. 9,943,241, or in the scale marketed by Withings™ under the name Body Cardio™. This solution effectively achieves electrical contact between the electrodes and the electronic circuits. However, the holes generate a risk of water or contaminants infiltrating the base and damaging the electronic circuits. In addition, the body scale manufacturing process is relatively complex, involving drilling holes and soldering wires, as well as steps designed to limit the risk of infiltration.

US2003/0149374 describes a body scale with electrodes on a substrate and conductive traces running on an edge of the substrate. Similarly, U.S. Pat. No. 9,943,241 describes running the electrodes on the edge of the scale. However, none of these documents gives any details on how to achieve such a configuration.

There is therefore a need for a measuring device and a method of manufacturing such a measuring device that does not have at least some of the disadvantages presented above.

SUMMARY

In particular, an electronic measuring device is proposed comprising:
a measuring plate, extending along a measuring plane and comprising: an upper face configured to receive a user's feet, a lower face, opposite the upper face, and a rounded edge connecting the upper face to the lower face; and
at least one electrode extending on the measuring plate, from the upper face to the lower face, passing over the rounded edge.

This ensures good electrical conduction of the electrode between the upper and lower faces of the measuring plate, avoiding the need to drill holes in the measuring plate and/or add inserts or metal parts. As a result, the top surface may be completely flat and uniform, making cleaning easier.

The features described in the following paragraphs can optionally be implemented independently or in combination with one another.

The rounded edge may be a convex surface. The rounded edge may be devoid of blind portions. The measuring device may be manufactured by two-stage application of conductive material to each face of the measuring plate, with each application covering a portion of the rounded edge. This makes the manufacturing process simpler, faster and more economical than a process requiring individual application to each face and to one or more edges of the plate.

The rounded edge may be tangent to the upper and lower faces. Electrical continuity of the electrode may be favored, as the electrode is formed on surfaces that do not have ridges or abrupt changes in direction.

The rounded edge may have a circular arc cross-section. The rounded edge can have good surface continuity, further improving electrical conduction of the at least one electrode between the upper and lower faces.

The device may comprise a plurality of electrodes, wherein each electrode may form a strip extending from the upper face to the lower face via the rounded edge, and the strips are for example parallel to each other. In this way, by multiplying the number of electrodes, the accuracy of measurements performed on the user can be improved. The arrangement of the electrodes in strips contributes to a better contact between the user's feet and the electrodes. The feet may come into contact with several electrodes regardless of the user's position on the measuring device.

The at least one electrode may be formed by a coating on the measuring plate. The thickness of the coating may be between approximately 100 nm and approximately 300 nm. This makes it possible to make the electrode(s) discreet, improving the aesthetics of the measuring device without compromising the conductivity of the electrodes.

The at least one electrode may be made of indium tin oxide (ITO), steel, nickel or copper alloy. These materials exhibit good conductivity even when they form thin electrodes. These materials thus contribute to good electrical conduction of the electrode(s) without compromising the aesthetics of the device. Such materials are also suitable for a device manufacturing process comprising two stages of material application, on each of the faces of the measuring plate. Preferably, the electrode is indium tin oxide, this material having better conductivity properties and being suitable for application by magnetron sputtering.

The device may further comprise at least one printed circuit board arranged opposite the lower face of the measuring plate, the at least one printed circuit board may comprise at least one electrical connector extending towards the lower face to contact the at least one electrode. In this way, electrical continuity can be ensured from the electrodes to the printed circuit boards. In particular, spring contacts provide a reliable connection by limiting the introduction of noise into the transmission. They can be quickly and easily mounted on the PCB (e.g., by soldering).

The device may also include at least one load cell attached to the measuring plate for determining a user's weight value. The load cell(s) may be mounted on the measuring plate.

The device may comprise four load cells, enabling a more accurate user weight value to be determined. In addition to measuring a weight value, the load cell(s) may also measure the user's off-center position on the measuring device.

The device may also comprise a support plate attached to the lower face of the measuring plate, the support plate being arranged to allow mounting electronic components of the device. The device may be assembled by mounting all the device electronics on the support plate and securing the support plate to the measuring plate (e.g. by screwing or gluing). This process is faster and more efficient than one in which the electronic components are mounted directly and individually on the measuring plate.

The device may also comprise a base, and the measuring plate may be recessed from the base (when the measuring device is viewed from above, along an axis orthogonal to the measuring plane). The measuring plate may be recessed at least at the rounded edge over which the at least one electrode extends. The base may thus be oversized relative to the measuring plate (at least at the level of the electrodes). The edges of the base protrude (when viewed from above) beyond the rounded edge of the measuring plate, and can protect the rounded edge from external stresses, such as impact or friction. This reduces the risk of electrode damage caused by such stresses.

The distance between the measuring plate and the base, measured according to the width of the measuring plate, may be between 0.4 mm and 2 cm, or even between 0.4 mm and 1 cm, or even between 0.4 mm and 2 mm. A small gap enables the measuring device to maintain a kind of structural unity (monolithic impression) and thus not present a shape that limits its gripping by a user. The small gap also acts as a bumper, for example against a bathroom wall where the scale is usually located. Alternatively, the gap may be larger, for example between 1 mm and 2 cm or 0.5 cm and 1 cm.

At least one electrode may extend on the lower face by at least 5 cm, or even at least 10 cm, or even at least 20 cm. As the lower face is not visible, the electrode pattern may be designed to optimally arrange the connectors. In particular, a single printed circuit board may be provided to make contact with all the electrodes, without increasing the size of the printed circuit board. The printed circuit board may be a main board of a measuring device control unit.

The device may further comprise at least one wireless communication module (e.g. for bidirectional communication) to a nearby device.

The device is a connected device. The user can access the measurements made by the device from his or her mobile terminal (or smartphone). In particular, the mobile terminal may have extended processing, memory and display capabilities, so that the user's interaction with the device can be enhanced (e.g., by enabling measurement tracking, device control and/or user identification).

According to another aspect, a method of manufacturing a measuring device is proposed, comprising the steps of:
providing a plate, referred to as a measuring plate, comprising: an upper face, configured to receive a user's feet; a lower face, opposite the upper face, and a rounded edge connecting the upper face to the inner face;
deposition of a layer of at least one conductive material on the upper face, the rounded edge and the lower face to form at least one electrode.

This method ensures good electrical conduction of the electrode between the upper and lower faces of the measuring plate.

The deposition step may comprise a first deposition of conductive material on the upper face and a first portion of the rounded edge; a second deposition of conductive material on the lower face and a second portion of the rounded edge, so that there is continuity of conductive material between the first portion of the rounded edge and the second portion of the rounded edge. Each deposit of conductive material may extend on a portion of the rounded edge to ensure electrical conduction between the upper and lower faces of the measuring plate. This makes the manufacturing process simpler, faster and more economical than a process requiring individual application to each face and one or more edges of the plate.

The process may also include a step for removing excess conductive material from the top face, rounded edge and lower face. Such a step removes the excess conductive material to form the electrodes and provide an aesthetically pleasing measuring plate. Preferably, the removal step may be performed by chemical etching.

The deposition stage may consist of only the first deposit and the second deposit.

The deposition step may be vapor deposition, evaporation or magnetron sputtering. Deposition is particularly suitable for forming electrodes. Preferably, the process is magnetron sputter deposition, which enables larger objects to be handled.

BRIEF DESCRIPTION OF THE DRAWINGS

Further features, details and advantages will become apparent from the detailed description below, and from an analysis of the appended drawings, on which.

DESCRIPTION OF EMBODIMENTS

Figure 1:
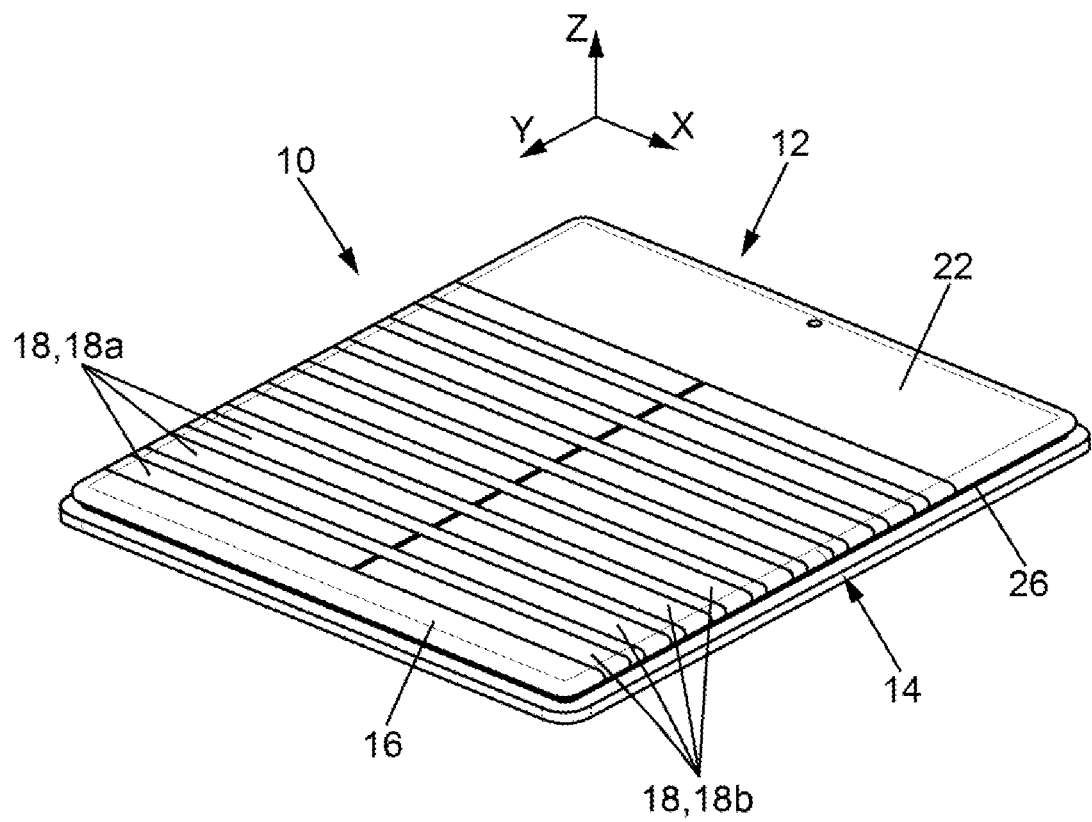
FIG. 1 shows a perspective view from above of a measuring device in one embodiment.

FIG. 1 schematically illustrates a measuring device 10 for performing biometric measurements on a user. For example, the measuring device 10 can measure the user's weight (or mass), impedance measurements (bioimpedance analysis, BIA, or impedance plethysmography analysis, IPG), electrocardiograms (ECG) and/or detect neuropathies.

When the measuring device 10 measures weight, it is referred to as an electronic body scale, but it is also possible to have a measuring device 10 that does not measure weight.

According to the illustrated example, the measuring device 10 has a generally square external shape (top view, Z-shape). However, the measuring device 10 could take any desired shape. The measuring device 10 may be rectangular, oval, round or any other variant.

The measuring device 10 comprises essentially, as illustrated, a measuring unit 12 and a base 14. The measuring unit 12 is designed to determine the user's biometric measurements. In particular, measuring unit 12 may comprise a measuring plate 16, at least one electrode 18 and an electronic assembly 20. The measuring plate 16 is configured to receive a user's feet. The base 14 and the measuring plate 16 define an internal volume 46 which houses the electronic assembly 20 (see FIG. 5).

In one embodiment, the base 14 can take up the forces received by the measuring plate 16, via load cells 32. In another embodiment (not shown), the base 14 can be used solely as a case to define the internal volume 46, and feet can take up the forces received by the measuring plate 16. These two variants are well known and will not be detailed here.

1. Weighing Plate 16

The measuring plate 16 is here a rigid flat plate extending along a measuring plane xy. The user can stand on the measuring plate 16, and the rigidity of plate 16 ensures resistance to stresses applied by the user.

Note that the measuring plate 16 shown is, when viewed from above (parallel to the measuring plane xy, along the z direction), substantially square in shape, but the measuring plate 16 could take any other shape, such as rectangular, oval or round. The measuring plate 16 may have curved or straight edges, or a combination of both.

The measuring plate 16 has an upper face 22 and a lower face 24, joined together by an edge 26. In particular, in one embodiment, edge 26 is rounded. By rounded, it is meant that edge 26 has no ridge, or at least no strongly marked ridge.

The top surface 22 is parallel to the measuring plane xy and forms an outer surface of the measuring device 10. Top surface 22 is intended to receive a user's feet when the user stands on measuring plate 16. The top surface 22 comes into contact with the user's feet.

The lower face 24, which may also be parallel to the measurement plane xy, is opposite the upper face 22. The lower face 24 forms an internal surface of the measuring device 10. In particular, the lower face 24 delimits a portion of the internal volume 46 housing the electronics assembly 20. The lower face 24 can thus interact with the electronic assembly 20.

The rounded edge 26 forms a joint between the upper face 22 and the lower face 24. The rounded edge 26 extends in the direction normal to the measuring plane xy (z direction shown in FIG. 1), from an edge of the upper face 22 to an edge of the lower face 24.

The at least one electrode 18 extends from the upper face 22 to the lower face 24, passing over the edge 26, which may be rounded (as previously described). Electrode 18 is arranged to be in contact with a user's foot at top face 22.

In the example shown, the rounded edge 26 extends around the entire periphery of the measuring plate 16. However, in one embodiment, the rounded edge 26 may extend over one or more portions of the periphery of the measuring plate 16. For example, the rounded edge 26 could extend over two opposite sides of a square or rectangular measuring plate 16. In one embodiment, the edge is rounded only where an electrode 18 is located.

The rounded edge 26 is here a convex surface, i.e., the rounded edge 26 bulges outwards relative to the edges of the upper and lower faces 22, 24. The rounded edge 26 is devoid of blind portions. In other words, the entire rounded edge 26 is visible when the measuring plate 16 is represented by a top view and a bottom view (when looking at the measuring plane xy from a direction along z). As will be described in more detail below, such a convex surface facilitates the formation of one or more electrodes 18 on the measuring plate 16.

Figure 4:
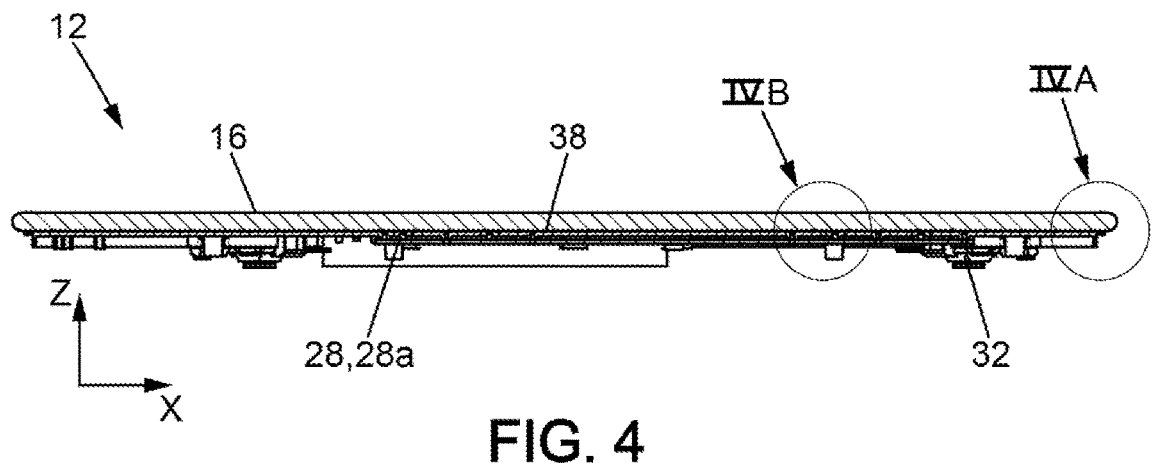
FIG. 4 shows a cross-section of the measuring unit shown in FIG. 3, in the xz plane.
Figure 4A:
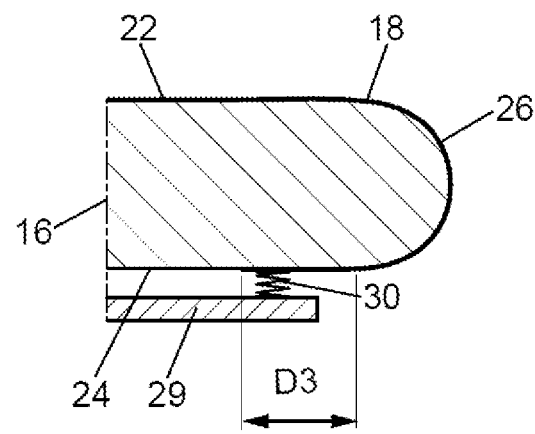
FIG. 4A schematically illustrates a first detail of FIG. 4.

As shown in FIG. 4a, the convex surface forming the rounded edge 26 is tangent to the edge of the upper face 22 and the edge of the lower face 24. The connection between the upper face 22 or lower face 24 and the rounded edge 26 is therefore continuous. The transition between either face 22, 24 and the rounded edge 26 is free of ridges or abrupt changes in direction. The electrical continuity of an electrode 18 extending from the upper face 22 to the lower face 24 via such a rounded edge 26 is improved.

In addition, here, the rounded edge 26 has a circular arc (or substantially circular arc) cross-section in a plane normal to the xy measurement plane (and parallel to the x or y direction, depending on the edge observed). This feature further enhances the surface continuity of the rounded edge 26, favoring the electrical continuity of the electrode 18. However, rounded edge 26 could also have an elliptical cross-section, for example to facilitate manufacture of plate 16. In one variant, the rounded edge 26 has rounded corners (the junction between the upper face 22 and the edge 26 and the junction between the lower face 24 and the edge 26) connected by a flat surface (parallel to the z axis). This variant may nevertheless feature blind portions (the flat surface). More generally, any convex section with a derivable edge (i.e., no ridge) is suitable.

The measuring plate 16 may be made of glass, but may also be made of metal, plastic (e.g. Plexigas™), aluminum (e.g. anodized aluminum), composite material, or any other material available to the skilled person. The dimensions of the measuring plate 16 may be chosen so as to give the plate 16 sufficient rigidity to withstand the stresses applied by the user standing on the measuring plate 16. The stresses may then be measured by the electronic unit 20, in particular using at least one load cell, to determine the weight or any off-center position of the user on the measuring device 10.

2. Electrodes 18

Electrode 18 is an external contact on measuring plate 16. It forms an electrically conductive path between the upper face 22 (for the user's feet) and the lower face 24 (for the electronics assembly 20). More specifically, the at least one electrode 18 extends on the measuring plate 16, from the upper face 22 to the lower face 24 via the rounded edge 26. Electrode(s) 18 can be used to circulate an electrical current between a terminal on the upper face 22 and a terminal on the lower face 24 of measuring plate 16, to apply a voltage to it, and/or to recover an electrical signal from the user (ECG type). Electrode(s) 18 can thus be used to measure impedance, determine electrocardiograms and/or detect neuropathies. As the electrode 18 passes over the edge 26, the measuring plate 16 may be devoid of holes for the passage of conductive wires ensuring current transmission from the upper face 22 to the lower face 24. The measuring plate 16 may thus be a surface without holes, limiting the risk of infiltration of water or contaminants into the measuring device 10 and forming an aesthetic plate. The measuring plate 16 may also be completely flat, making it easier to clean.

Figure 2:
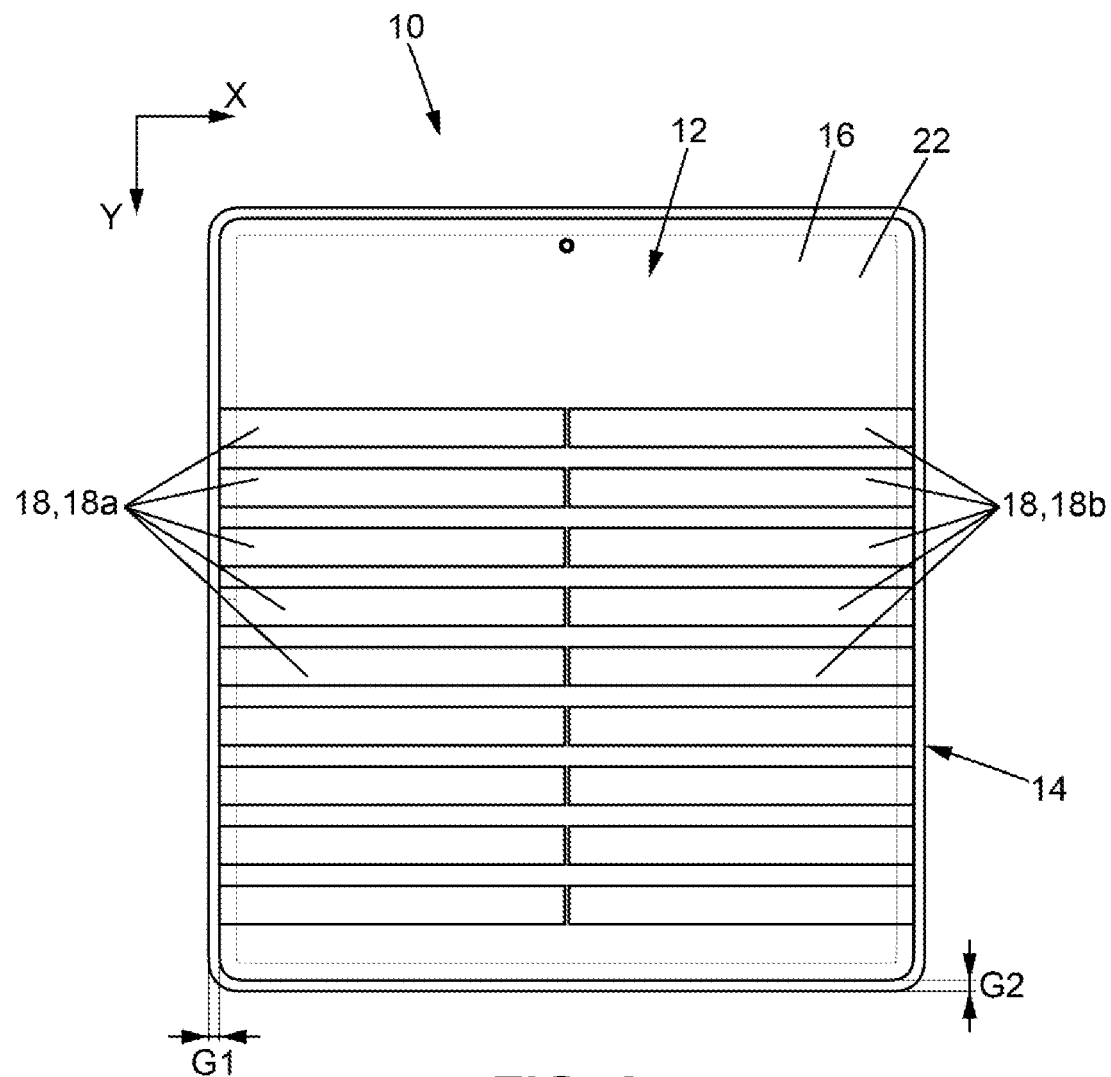
FIG. 2 shows a top view of the measuring device shown in FIG. 1.

As shown in FIG. 2, a first group of electrodes 18a and a second group of electrodes 18b extend on the measuring plate 16. Alternatively, some strips of material may not be electrically connected (aesthetic consideration only). The first group of electrodes 18a is designed to make contact with the user's left foot, and the second group of electrodes 18*b* is designed to make contact with the right foot. Among each group of electrodes 18*a*, 18*b*, one or more electrodes 18 can emit a current or receive a current and/or measure a potential. Configurations of electrodes 18 for impedance measurement or ECG are known and will not be described here.

The minimum distance between the first electrode group 18*a* and the second electrode group 18*b* (in FIG. 2, measured along the width of the measuring plate 16, i.e. the x direction, due to the configuration of two electrode groups 18*a*, 18*b* facing each other), may be between 1 and 4 mm, and/or 2 mm. To limit interference between the first and second electrode groups 18*a*, 18*b*, this distance can be increased.

Alternatively, a single electrode group 18 could be provided on the measuring plate 16, and another electrode or electrode group could be separate from the measuring plate 16.

Returning to FIG. 2, each electrode group 18*a*, 18*b* comprises a plurality of electrodes 18 (e.g. two electrodes per group or more than two electrodes per group), so as to increase the accuracy of impedance measurements. However, it is possible for each group of electrodes 18*a*, 18*b* to comprise a single electrode 18.

In particular, as illustrated in FIG. 1, each electrode 18 may extend substantially in one direction of the width of the measuring plate 16 (x direction as shown in FIG. 2) from the middle of the top face 22, to ensure contact with the user's foot. In addition, each electrode 18 extends on the lower face 24 for at least 1 cm from the end of the measuring plate 16 (distance D3 in FIG. 4*a*). This ensures that the current flowing through the electrode 18 can be transmitted to or from the electronics assembly 20, for example by leaving room for mounting an electrical connector 30 between the lower face 24 and the electronics assembly 20.

Each electrode 18 may take the form of a strip, the strips of each of the first and second groups 18*a*, 18*b* being parallel to each other, for example. The arrangement of electrodes 18 in strips contributes to better contact between the user's feet and electrodes 18. The user's feet can come into contact with several electrodes 18 whatever the user's position on the measuring device 10.

Alternatively, each electrode 18 may take the form of a square or rectangle extending to the edge 26. Alternatively, the electrodes have different shapes.

Each electrode 18 is typically formed by coating on the measuring plate 16. As will be described in more detail below, the rounded edge 26 of the measuring plate 16 is particularly suitable for forming electrodes by coating. In addition, the rounded, ridge-free edge 26 improves the adhesion of the coating to the measuring plate 16 and minimizes the risk of contact loss at a ridge. Indeed, on a ridge, the coating thickness may be lower (because contact with the measuring plate 16 is more limited due to the strong local curvature) and the coating may then be more easily exposed to wear or blows.

Each electrode 18 may be made of indium tin oxide (ITO), steel, nickel, a copper alloy or another suitable material. These materials exhibit good conductivity even when thin electrodes 18 are formed. Each electrode 18 (formed by coating) may have a thickness of between 100 nm and 300 nm and/or a resistance squared of less than 75 Ohm/square (+/−15 Ohm/square). These materials contribute to the good electrical conduction of the electrode(s) 18 without compromising the aesthetics of the measuring device 10.

In one embodiment, the electrode(s) 18 may be made of a first material on the upper face 22 and of a second material, different from the first material, on the lower face 24. The junction between the materials may take place at the edge 26 (see process described in more detail below). ITO may be used as the first material, on the upper face 22, as it is transparent and thus contributes to the aesthetics of the exterior of the measuring device 10. In addition, a sober measuring device 10 can help to increase user retention, as users do not feel they are using a sophisticated measuring device that can help to detect diseases or physical conditions. The second material, used on the lower face 24, may be simpler to apply and/or less expensive. Indeed, there are no aesthetic considerations on the lower face 24 (for example, the transparency of the coating). This other material may be a conductive paint or a standard PVD-coated material.

The electrodes 18 may extend on the lower face 24 over a distance of between 1 cm and 20 cm (from the edge towards the middle part of the lower face 24). To simplify the assembly with the connectors and avoid the latter being too close to the edge 26, a distance of at least 4 cm may be chosen. In one embodiment, the connectors 30 are positioned as centrally as possible on the scale. Alternatively, the electrodes are arranged on the lower face 24 in such a way that the connectors 30 are integrated in the smallest possible space (the connectors of the two groups of electrodes), so that they can, for example, be connected to a single board, the so-called main board, which will be described later. As the lower face 24 is not visible, the electrodes may be arranged in a particularly free way, thus optimizing the architecture.

3. Electronic Assembly 20

The electronics assembly 20 is positioned in the internal volume 46 formed by the measuring plate 16 and the base 14. The electronic assembly 20 extends towards the lower face 24 to interact with the measuring plate 16 and the at least one electrode 18.

The electronic assembly 20 comprises at least one printed circuit board 28, at least one load cell 32 and a control unit 34. The circuit boards 28 are involved in transmitting electric current to and from the electrodes 18. The load cells 32 may be used to measure the forces applied by the user placed on the measuring plate 16, in particular to measure weight or to determine any off-center position of the user relative to the measuring plate 16. Load cells 32 can also be used to perform a BCG. The control unit 34 may centralize and coordinate the electronic assembly 20 and communicate with the user. The control unit 34 may be mounted on a main board.

Figure 3:
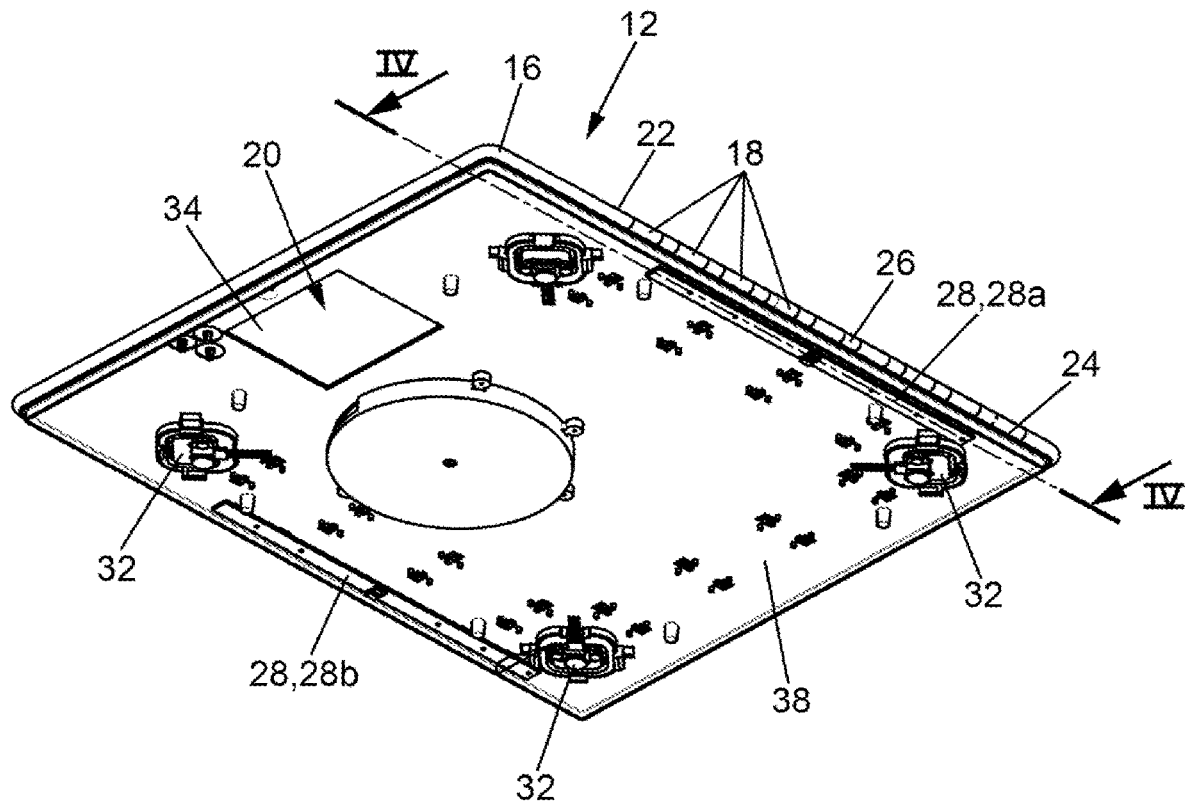
FIG. 3 shows a perspective view of the lower face of a measuring unit that can be used in the measuring device shown in FIG. 1 (base not shown).

As shown in FIG. 3, a first printed circuit board 28*a* and a second printed circuit board 28*b* extend opposite the lower face 24 of the measuring plate 16. The first printed circuit 28*a* extends opposite the first group of electrodes 18*a*, to make contact with each electrode 18 of the first group of electrodes 18*a*. On the other hand, the second printed circuit 28*b* extends opposite the second group of electrodes 18*b*, so as to make contact with each electrode 18 of the second group of electrodes 18*b*. In a variant already mentioned, a single printed circuit board is provided to make contact for both groups of electrodes. This circuit board may be the main board itself, which reduces the number of parts and thus simplifies assembly and cuts costs. This variant is particularly applicable with electrodes extending up to 10 cm on the lower face 24 (e.g., at least up to about the center of the measuring plate 16).

Figure 4B:
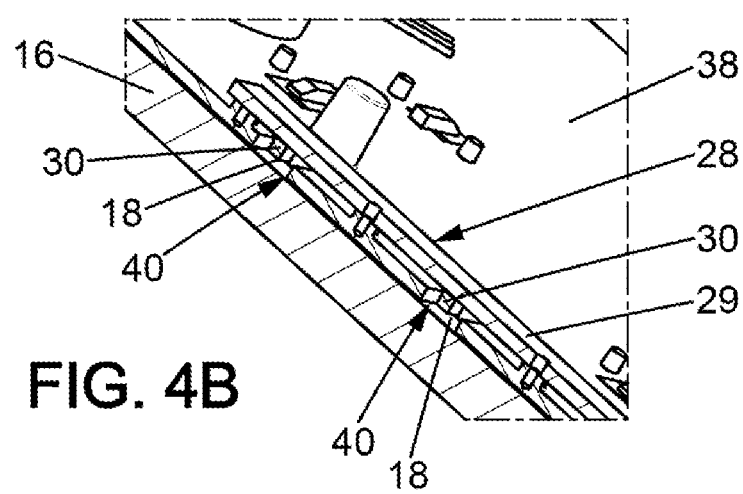
FIG. 4B schematically illustrates a second detail of FIG. 4.

As shown in FIGS. 4a and 4b, each printed circuit board 28 comprises a Printed Circuit Board 29, to which one or more electrical connectors 30 are soldered. In the figures, the connectors 30 are spring contacts 30 (such as spring-finger contacts 30). In this case, each connector 30 extends from circuit board 29 to electrode 18. Each connector 30 provides the electrical connection between circuit board 29 and electrode 18. In particular, spring contacts 30 provide a stable electrical connection by limiting the introduction of noise into current transmission, and are easy to mount on circuit board 29 (particularly by soldering). Alternatively, however, the connector 30 may be a wire to connect the circuit board 29 to each electrode 18. Alternatively, conductive elastomer materials may be used (which are, for example, slightly compressed between circuit board 29 and lower face 24 to ensure electrical contact).

In FIG. 3, four load cells 32 are arranged in the vicinity of each of the four corners of the measuring device 10. Alternatively, when the measuring device 10 has a round or oval shape, four load cells 32 could be evenly distributed around a median axis of the measuring device 10. Preferably, load cells 32 comprising two deformation gauges are chosen, in particular gauges comprising a first element whose resistance increases under the effect of a vertical compression applied to the foot in question, and a second element whose resistance decreases under the effect of said vertical compression. The load cells 32 take up the forces between the measuring plate 16 and the base 14. Alternatively, as described above, the load cells 32 can take up the forces between the measuring plate 16 and one or more feet (for example, one load cell per foot). The base 14 can then be mechanically fixed to the measuring plate 16.

Figure 6:
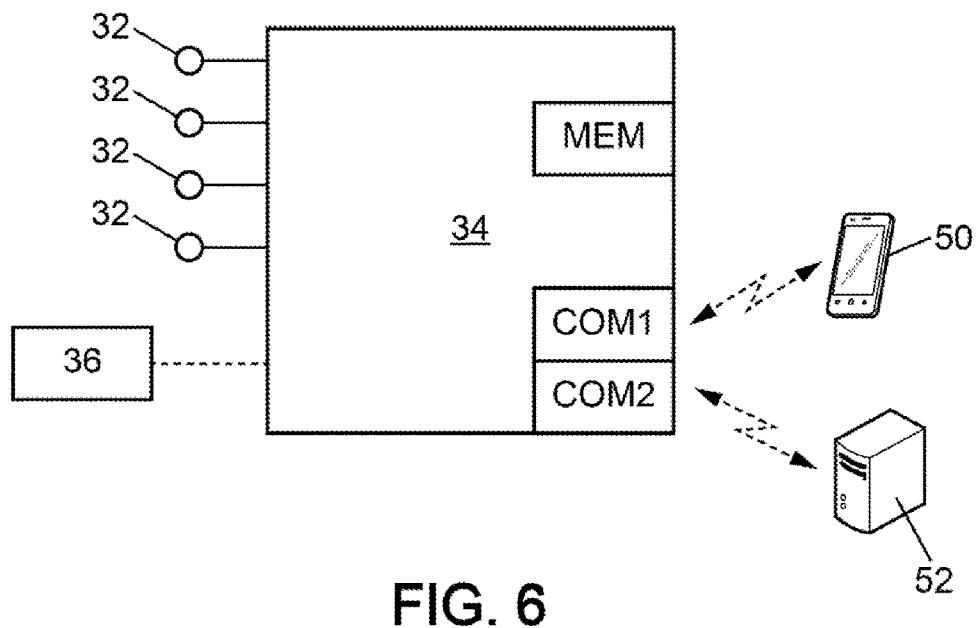
FIG. 6 schematically illustrates a control unit for the measuring device shown in FIG. 1.

As shown schematically in FIG. 6, the control unit 34 is connected to each circuit board 28 and load cell 32. The control unit 34 may be connected by means of terminal strips and/or wires. The control unit 34 can interact with each electrode 18 and each load cell 32 to determine one or more items of information such as weight, decentering, impedance measurement, electrocardiogram and/or neuropathy. The control unit 34 may also be connected to a display 36 of the measuring device 10, to interact with the user, for example by displaying the information determined.

The electronic control unit 34 may include a first short-range wireless communication module COM1. The first COM1 communication module operates a local area network, for example Bluetooth, Low-Energy Bluetooth (BLE) and/or Wi-fi. The first communication module COM1 communicates with a device 50 in the vicinity of the measuring device 10. Proximity device 50 may be, for example, a mobile terminal ("smartphone"), a connected watch or any other device associated with the user. The first wireless communication module COM1 may be used to identify the user standing on the measuring device 10, to receive commands from the user or to transmit one or more items of information determined by the measuring device 10 to the nearby device 50.

The electronic control unit 34 may include a second wireless communication module COM2. The second communication module COM2 may be provided in addition to or instead of the first communication module COM1. The second COM2 communication module uses the cellular network, for example GSM, 3G, 4G(-LTE), LTE-M, 5G or any cellular network dedicated to connected objects. The second communication module COM2 provides the measuring device 10 with a communication interface to a remote server 52. Information determined by the measuring device 10 may be sent to the remote server 52. The information may then be made accessible to the user from any device adapted to connect to the server 52, for example the user's smartphone, a doctor's smartphone or a computer.

The control unit 34 also comprises a MEM memory. The MEM memory may store a plurality of information, for example information determined by the measuring device 10 or information received from the nearby device 50 and/or the remote server 52. The plurality of information may be sent periodically to the server 52, for example once a week. The frequency of use of the second COM2 communication module can be reduced, reducing the power consumption of the control unit 34.

The electronic assembly 20 of the measuring device 10 may be powered by a battery, for example a lithium-ion battery. The battery may be housed with the electronic assembly 20 in the internal volume 46 defined by the measuring plate 16 and the base 14.

Here, the electronics assembly 20 is mounted on a support plate 38 to facilitate assembly of the measuring device 10. The support plate 38 is attached to the measuring plate 16. The support plate 38 may, for example, be a plastic part glued to the lower face 24 of the support plate 38, so as to avoid any drilling of the measuring plate 16. The measuring plate 16 is free of holes, and the risk of water or contaminants infiltrating and damaging the electronic assembly 20 is reduced. Alternatively, however, the components of the electronics assembly 20 could be secured to the base 14.

The components of the electronics assembly 20 may be screwed onto the support plate 38. As shown in FIG. 3, the support plate 38 may have housing for the load cells 32. In addition, as shown in FIG. 3, the support plate 38 may have apertures 40 opposite each electrode 18 to allow the spring contacts 30 to pass through.

4. Base 14

The base 14 forms a base to receive the measuring unit 12. In an embodiment where the measuring device 10 is a body scale, the measuring unit 12 is slightly movable relative to the base 14 in the direction normal to the xy measuring plane (z direction shown in FIGS. 1 and 5). Such mobility makes it possible to measure the displacement of the measuring plate 16 when the user places himself or herself on the measuring device 10, enabling in particular an estimation of the user's weight and/or decentering.

Figure 5:
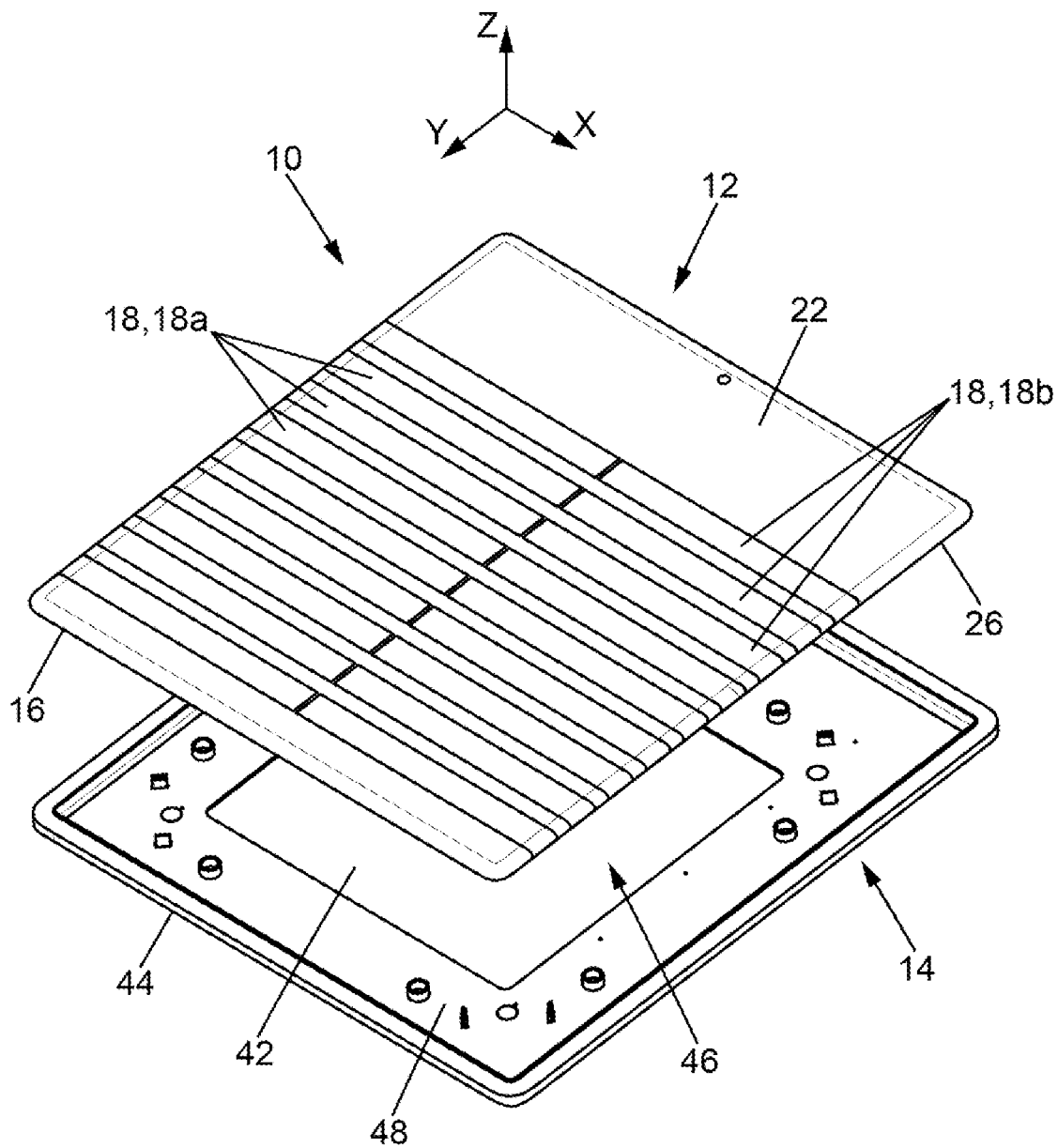
FIG. 5 shows an exploded top view of the measuring device shown in FIG. 1.

As shown in FIG. 5, the base 14 forms a base on which the measuring unit 12 is mounted. Alternatively, the base 14 could comprise four feet arranged in the vicinity of each corner of the measuring plate 16.

In the example shown here, the base 14 has a generally square shape, corresponding to the shape of the measuring plate 16. In this case, the base 14 could have the same shape as the measuring plate 16, or a shape distinct from the measuring plate 16. For example, the base 14 could have a square or rectangular shape, while the measuring plate 16 is oval or round.

In one embodiment, particularly visible in FIG. 2, the base 14 is oversized relative to the measuring plate 16 when viewed from above the xy measuring plane (along the z axis). In the example shown, the perimeter of the measuring plate 16 is inscribed within the perimeter of the base 14. Alternatively, the base 14 may extend beyond the measuring plate 16 in the xy plane only at a rounded edge 26. In this case, oversizing protects the electrodes 18 from damage caused by impact or friction. Conversely, however, the base 14 may be undersized in relation to the measuring plate 16, for aesthetic reasons or to make it slightly easier to pick up the measuring device 10 by allowing the user to grasp the measuring plate 16.

In the case of an oversized base, when viewed from above, base 14 may have x dimensions (see gap G1 in FIG. 2) and/or y dimensions (see gap G2 in FIG. 2) greater than those of the edge of measuring plate 16, at least where an electrode 18 is located. The base 14 then functions as a bumper for the measuring plate 16, particularly when the measuring device 10 is slid along the floor. On the one hand, the base 14 protects the measuring plate 16 from impacts, and on the other hand, it protects the electrodes 18 at the edge 26. In one embodiment, the base 14 has larger x-dimensions (i.e. at the edges where the electrodes are located) than the measuring plate 16 (i.e. the gap G1). This embodiment protects the edges of the measuring plate 16 where the electrodes are located. The other edges, where there are no electrodes, may be recessed in the same way (see gap G2), or be level, or project further. Edges where there are no electrodes may not be rounded. When there is oversizing as described above, the gap G1, G2 between the measuring plate 16 and the base 14 is typically between 0.4 mm and 2 cm, or even between 0.4 mm and 1 cm, or even between 0.4 mm and 2 mm. A small gap G1, G2 maintains the blocky appearance of the measuring device, which is convenient for the user to grip, while maintaining the bumper effect.

Alternatively, the gap G1 and/or G2 may be larger, for example between 1 mm and 2 cm or 0.5 cm and 1 cm.

As shown in FIG. 5, the base 14 may comprise a flat portion 42 and a peripheral portion 44 projecting from the flat portion 42 in the direction normal to the measurement plane xy, forming an edge. Together with the measuring plate 16, the base 14 forms the internal volume 46 housing the electronic assembly 20. The measuring device 10 comprising the base 14 and the measuring unit 12 may have a small thickness (in the direction normal z to the measuring plane xy). For example, the total thickness of the measuring device 10 may be less than 3 cm, or even 2.5 cm.

The base 14 may be made of plastic or comprise plastic (plastic, fiber-reinforced plastic, metal-reinforced plastic) and/or be made of metal or comprise metal (aluminum, steel, etc.). Light but strong materials are preferred.

A mounting part 48 may be received in the internal volume 46, to cooperate with the support plate 38 of the measuring unit 12. Mounting part 48 may, for example, be a plastic part glued into internal volume 46 and suitable for cooperating with support plate 38. This facilitates assembly of the measuring device 10.

In one embodiment, one or more mounting parts may be provided to mechanically guide the measuring plate 16 relative to the base 14, to allow movement in the Z direction while preventing misalignment in the X and Y directions. For example, a mounting as described in the applicant's U.S. Pat. No. 10,309,823 patent may be used.

5. Manufacturing Process

Figure 7:
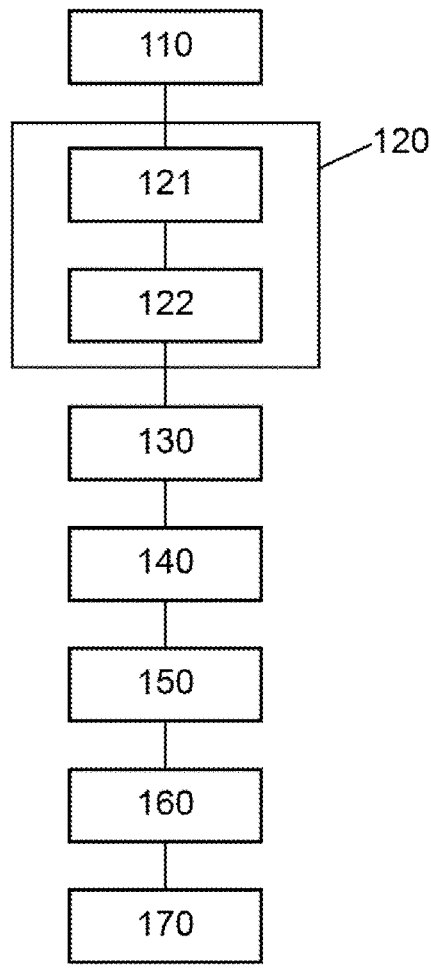
FIG. 7 shows a flowchart of a manufacturing process for the measuring device shown in FIG. 1.

A process for manufacturing and assembling the measuring device 10 described above is now described, with reference to FIG. 7.

In a first step 110, a flat plate is provided, for example one made of glass, metal, composite material, aluminum (anodized type) or plastic. The flat plate may be injection-molded and cut to the desired shape and dimensions of the measuring plate 16. The flat plate is also profiled to present the rounded edge 26. The rounded edge 26 may be produced by injection molding or by subsequent glass cutting.

In a second step 120, a layer of conductive material is deposited on the upper face 22, the rounded edge 26, and the lower face 24 to form the at least one electrode 18. The conductive material may be deposited by Physical Vapor Deposition (PVD), in particular by evaporation or magnetron sputtering. The measuring plate 16 is then positioned in a deposition furnace and conductive material is applied by a sputter. For example, the deposited material may be ITO, nickel, steel or a copper alloy. Alternatively, a conductive paint or coating such as Tecticoat™ (marketed by Heraeus) may be used.

In this case, the second step 120 comprises a sub-step 121 for deposition on the upper face 22, and a sub-step 122 for deposition on the lower face 24. Advantageously, the rounded edge 26 as described above enables the at least one electrode 18 to be formed solely from sub-steps 121 and 122. In fact, as the rounded edge 26 is a convex surface (more precisely, a surface without blind zones when viewed from above and/or below), the deposit on the upper face 22 and the lower face 24 is sufficient to cover the entire rounded edge 26 with conductive material. Each of the deposits covers a portion of the rounded edge 26, and there are no blind portions to the deposit of conductive material. In practice, there may be a slight overlap of the two layers, but the cumulative thickness of the two layers may not be greater than the thickness of a single layer (due to the location of edge 26 relative to the sprayer). This makes the manufacturing process simpler, faster and more economical than one requiring individual application to each face and one or more edges of the sheet. In addition, such a process avoids the need to adapt the vapor deposition furnace to accommodate the plate 16 in a different position, or to spray the conductive material onto the edge 26.

The second, deposition step 120 may comprise only sub-step 121 and sub-step 122 (i.e. no edge-specific deposition step).

In one embodiment, sub-step 121 for deposition on the upper face 22 is a deposition of a first conductive material as discussed above, and sub-step 122 for deposition on the lower face 24 is a deposition of a second conductive material, as discussed above. The use of two distinct materials enables a transparent material to be used for coating the upper face 22, which is visible to the user, and a material that is simpler to apply and/or less costly for the lower face 24, which is not visible.

Note that sub-steps 121 and 122 are interchangeable. Sub-step 121 for deposition on the upper face 22 may be either before or after sub-step 122 for deposition on the lower face 24.

In a third step 130, the excess conductive material is removed from the upper face 22, the lower face 24 and the rounded edge 26, so as to delimit the electrodes 18 and improve the aesthetics of the measuring plate 16. The excess conductive material may be removed by chemical etching.

The remainder of the procedure concerns the assembly of the measuring device 10. The steps described may be carried out in various ways. A non-limiting example for each step is given.

In a fourth step 140, the support plate 38 is supplied. The support plate 38 may have been manufactured by molding a plastic material. In a fourth step 140, the electronics assembly 20 is mounted on the support plate 38. The components of the electronic assembly 20 may, for example, be received in housings on the support plate 38, or screwed or glued to the support plate 38. Mounting the electronics assembly 20 on the support plate 38 facilitates integration of the electronics of the measuring device 10. To prepare the support plate 38, the electrical connectors 30 are mounted on the circuit boards 29 (PCB) which will face the electrodes 18. The circuit boards 29 may be mounted on the support plate 38 before or after step 150.

In a fifth step 150, the support plate 38 is joined to the measuring plate 16 to form the measuring unit 12. The support plate 38 is glued, for example, to the lower face 24 of the measuring plate 16. It should be noted that the connection between the electronic assembly 20 and the measuring plate 16 does not comprise any drilling or soldering steps to bring the electrodes 18 into contact with the electronic assembly 20. The manufacturing process is free of tricky steps with a high scrap rate.

In a sixth step 160, the base 14 is supplied. The base may be formed by machining or molding a plastic or metal material. The mounting part 48 may optionally be inserted into the base 14, and secured by gluing or screwing. Mounting part 48 may also be molded from plastic.

Step 170 assembles the measuring unit 12 with the base 14 to form the measuring device 10. For example, protrusions provided in the mounting plate 38 of the measuring unit 12 may cooperate with housings provided in the mounting part 48.

The invention claimed is:

1. An electronic measuring device comprising:
   a measuring plate, extending along a measuring plane and comprising:
     an upper face configured to receive a user's feet;
     a lower face opposite the upper face, and
     a rounded edge connecting the upper face to the lower face, and
   at least one electrode extending on the measuring plate, from the upper face over the rounded edge to the lower face.

2. The measuring device according to claim 1, wherein the rounded edge is a convex surface.

3. The measuring device according to claim 1, wherein the rounded edge is tangent to the upper face and the lower face.

4. The measuring device according to claim 1, wherein the rounded edge has a circular arc cross-section.

5. The measuring device according to claim 1, comprising a plurality of electrodes, wherein each electrode forms a strip extending from the upper face to the lower face via the rounded edge, and the strips are for example parallel to each other.

6. The measuring device according to claim 1, wherein the at least one electrode is formed by a coating on the measuring plate.

7. The measuring device according to claim 1, wherein the at least one electrode extends over the lower face by at least 10 cm.

8. The measuring device according to claim 1, further comprising at least one printed circuit arranged opposite the lower face of the measuring plate, the at least one printed circuit comprising at least one electrical connector extending towards the lower face to contact the at least one electrode.

9. The measuring device according to claim 8, wherein the at least one printed circuit board is unique and is connected to all the at least one electrode by electrical connectors.

10. The measuring device according to claim 1, further comprising a base, wherein the measuring plate is recessed from the base, at least at the rounded edge over which the at least one electrode extends.

11. The measuring device according to claim 10, wherein the recess comprises a gap between the measuring plate and the base which is comprised between 0.4 mm and 2 cm, or between 0.4 mm and 1 cm, or between 0.4 mm and 2 mm.

12. A process of manufacturing a measuring device, comprising the steps of:
   providing a measuring plate, comprising:
     an upper face, configured to receive a user's feet;
     a lower face opposite the upper face, and
     a rounded edge connecting the upper face to the lower face, and
   depositing a layer of at least one conductive material on the upper face, the rounded edge and the lower face to form at least one electrode.

13. The manufacturing process according to claim 12, wherein the depositing comprises:
   a first deposition of conductive material on the upper face and a first portion of the rounded edge;
   a second deposition of conductive material on the lower face and a second portion of the rounded edge, so that there is continuity of conductive material between the first portion of the rounded edge and the second portion of the rounded edge.

14. The manufacturing process according to claim 12, further comprising removing excess conductive material from the upper face, the rounded edge and the lower face.

15. The manufacturing process according to claim 13, wherein the depositing is composed solely of the first deposition and the second deposition.

16. The manufacturing process according to claim 12, wherein the depositing is carried out by vapor deposition, by evaporation or magnetron sputtering.

17. The measuring device according to claim 5, wherein the strips are parallel to each other.

* * * * *